(12) United States Patent
Yoshida (10) Patent No.: US 7,579,051 B2
(45) Date of Patent: Aug. 25, 2009

(54) METHOD FOR MANUFACTURING AN ELECTRON EMITTER

(75) Inventor: Makoto Yoshida, Matsumoto (JP)

(73) Assignee: Seiko Epson Corporation (JP)

( * ) Notice: Subject to any disclaimer, the term of this patent is extended or adjusted under 35 U.S.C. 154(b) by 524 days.

(21) Appl. No.: 11/351,497

(22) Filed: Feb. 10, 2006

(65) Prior Publication Data
US 2006/0217026 A1 Sep. 28, 2006

(30) Foreign Application Priority Data
Mar. 23, 2005 (JP) ............................. 2005-083395

(51) Int. Cl.
*H05H 1/32* (2006.01)
*H01J 9/02* (2006.01)
*H01L 21/00* (2006.01)

(52) U.S. Cl. ..................... 427/540; 445/24; 445/50; 445/51; 438/22; 438/200; 438/688; 438/715; 438/778

(58) Field of Classification Search .............. 427/540; 445/24, 50, 51; 438/22, 200, 688, 778, 715
See application file for complete search history.

(56) References Cited
U.S. PATENT DOCUMENTS
6,017,259 A * 1/2000 Motoi et al. .................. 445/51
6,734,029 B2 * 5/2004 Furusawa ..................... 438/22

FOREIGN PATENT DOCUMENTS

| EP | 769796 | 4/1997 |
|---|---|---|
| JP | 03-203144 | 9/1991 |
| JP | 09-245625 | 9/1997 |
| JP | 10-003852 | 1/1998 |
| JP | 10-069850 | 3/1998 |
| JP | 2001-307621 | 11/2001 |
| JP | 2003-157760 | 5/2003 |
| JP | 2004-192811 | 7/2004 |

* cited by examiner

*Primary Examiner*—Michael Kornakov
*Assistant Examiner*—Xiao Zhao
(74) *Attorney, Agent, or Firm*—Harness, Dickey & Pierce, P.L.C.

(57) ABSTRACT

A method for manufacturing an electron emitter, the method includes discharging a droplet of a function liquid containing a material for forming the conductive film onto a discharge surface of the substrate by a droplet discharge device to adhere a liquid-state object to at least part of an area in which the conductive film is to be formed, drying the liquid-state to form the conductive film, and forming an electron emission section in the conductive film by applying an current between the pair of element electrodes, wherein when accompanied by the drying to form the conductive film, the discharging forms the liquid-state object in a shape having a constricted part for forming a latent image section that has a relatively thin film thickness in a portion for forming the electron emitter.

3 Claims, 11 Drawing Sheets

METHOD FOR MANUFACTURING AN ELECTRON EMITTER

BACKGROUND OF THE INVENTION

1. Technical Field

The present invention relates to an electron emitter a method of manufacturing the electron emitter, a display, and an electrode apparatus.

2. Related Art

As conventional methods of manufacturing an electron emitter an electron emission section has been usually formed in a conductive film placed between element electrodes by applying a current. However, it is difficult to control where in the conductive film the electron emission section is formed as a result of applying a current. Since the position of the electron emission section varies for each electron emit the current emitted from the electron emission section differs for each electron emitter. This causes problems such as brightness irregularity of an image. To solve the problem, a method of manufacturing an electron emitter disclosed in JP A-10-69851, an example of related art, uses two different function liquids to form a thick portion and a thin portion in a conductive film or uses different kinds of material for the film, so that when a current is applied at a side having a relative high resistance in the film, the current density is increased to form an electron emission section.

In the method of manufacturing an electron emitter as described above, however, since a conductive film is formed by discharging droplets of function liquids with different characteristics, there has been a problem of increasing the number of manufacturing processes. For example, limitations are imposed on the discharge conditions for each function liquid and when a plurality of droplets are discharged, the droplets are needed to be dried one by one.

SUMMARY

To solve the above problem, an advantage of the present invention is to provide an electron emitter and its manufacturing method that are capable of manufacturing an electron emitter easily.

According to an aspect of the invention, a method of manufacturing an electron emitter having a pair of element electrodes formed on a substrate, a conductive film connected to both of the element electrodes, and an electron emission section formed in part of the conducive film, includes discharging a droplet of a function liquid containing a material for forming the conductive film onto a discharge surface of the substrate by a droplet discharge device to adhere a liquid-state object to at least part of an area in which the conducive film is to be formed, drying the liquid-state object so as to make the liquid-state object become the conductive film, and forming an electron emission section in the conductive film by applying an current between the pair of element electrodes, wherein if accompanied by the dying to form the conducive film, the discharging forms the liquid-state object in a shape having a constricted part for forming a latent image section that has a relatively thin film thickness in a portion for forming the electron emitter.

It is sufficient that part of the conductive film connected to the pair of element electrodes has a droplet shape including the constricted part; the part may be dried either together with other parts than the part or independently. The droplet including the constricted part may be composed of either one droplet or a plurality of droplets. Moreover, a shape inducing means such as a surface treatment may be applied to the discharge surface so that the droplet shape has the constricted part, as the need arises.

The drying sobbed above refers to a process including drying that removes a component causing a solvent or the like contained in a droplet to be in a liquid state, and may include firing (firing process) that is performed as necessary after a droplet is solidified in a film state by drying. The drying may be either natural drying or drying by adding heat from the outside or generating heat inside a droplet.

In such a manner as described above, when a function liquid is discharged onto a discharge surface, a droplet having a constricted part is formed. The droplet becomes a conductive film by drying, and thus a constricted part (latent image section) is formed in a substantially straight line in a portion corresponding to the constricted part of the droplet. Thereafter, when a current is applied, Joule heat is generated in the constructed part of the conductive film and therefore the constructed part is broken, thereby forming an electron emission section. Thus, the number of passes of drying a droplet that is required for forming an electron emitter can be reduced.

In this manufacturing method, the discharging may be performed to form a droplet so that a surface of the droplet in contact with the discharge she has a shape of being constricted in a portion corresponding to an end of the electron emission section, and the drying may make the droplet dried to form the latent image section that facilitates formation of the election emission section in a portion corresponding to the constricted part of the droplet.

Accordingly, in an area on the discharge surface including a position at which an electron emission section is to be formed, a droplet is formed so that its contact surface has a shape with the constricted part in a portion corresponding to the election emission section. At this point, the droplet becomes constricted also in the height direction at a portion corresponding to the consumed part of the contact surface, and thereby is three-dimensionally constricted in a portion corresponding to the electron emission section. If the wettability between the droplet and the contacted surface is not so satisfactory (that is, if the contact angle of the droplet to the contracted surface is relatively large), the degree to which the droplet is constricted in the height direction is increased, and thus the three-dimensionally constricted part becomes more remarkable. Since the latent image section is made in one predetermined portion corresponding to the constricted part, the election emission section is formed in one predetermined portion.

In this manufacturing method, the discharging may be performed to discharge the function liquid onto the discharge to which a surface treatment inducing the droplet so that the surface of the droplet in contact with the discharge surface has a shape of being constricted in a portion corresponding to an end of the electron emission section has been applied.

Accordingly, the surface treatment for a constricted shape has been applied at the discharge position on the substrate, and therefore when discharged, the droplet is induced by the surface treatment. The constricted shape can thus be formed easily.

In this manufacturing method, the discharging may be performed at wider intervals in a portion corresponding to the latent image section to form the constricted part.

Accordingly, since a distance between the droplets can be extended in a portion corresponding to the latent image section by discharging the droplets at wider intervals, the constricted part can be formed in a contact portion of the droplets.

In this manufacturing method, the discharging may be performed to discharge function liquids containing a material for forming the conductive in solvents that repel each other at different positions of the substrate and combine the function liquids to form the constricted part in the interface of the function liquids.

Accordingly, function liquids containing different solvents are discharged at different positions on the substrate to form a plurality of liquid-state objects made from the different function liquids on the substrate, and the plurality of liquid-state objects repel each other and their bottom portions, while are located lower than the tops, are in contact with each other at the interface. Namely, the constricted part is formed along the contact portion where the plurality of liquid-state objects are in contact with each other at the interface. Hence, the constricted part can be formed easily. The term "solvent" as used herein is a concept including a solvent medium. Therefore, containing a material for the conductive film dispersed in a solvent is sufficient for the function liquid, and it is not indispensable that the material is dissolved in a solvent. Obvious the function liquid may be one containing a material dissolved in a solvent.

An electron emitter according to another aspect of the invention is manufactured by this method.

Accordingly, an electron emitter manufactured by this method has a constricted part in the conductive film, and therefore an electron emission section can be manufactured easily.

A display according to a further aspect of the invention has the electron emitter described above.

Accordingly, an electro-optical device can have an electron emitter with high reliability. Examples of this elector-optical device include, for example, conduction electron-emitter displays (hereinafter referred to as SEDs).

An electronic apparatus according to a still further aspect of the invention has the above-described electro-optical device mounted thereon.

Accordingly, the electronic apparatus can have an electro-optical device with high reliability mounted thereon. In this case, examples of the electronic apparatus include, for example, television receivers having the above SED mounted thereon, personal computers, and various electrode items.

BRIEF DESCRIPTION OF THE DRAWINGS

The invention will be desired with reference to the accompanying drawings, wherein like numbers refer to like elements.

FIGS. 8A-1 through 8E are sectional views schematically illustrating manufacturing processes of the electron emitter in the first embodiment.

FIGS. 10A through 10G are sectional views schematically illustrating manufacturing processes of the electron emitter in the second embodiment.

FIGS. 12A through 12E are sectional views schematically illustrating manufacturing processes of the electron emitter in the third embodiment.

DESCRIPTION OF THE EMBODIMENTS

First to third embodiments that embody the present invention will now be described.

First Embodiment

Figure 1:
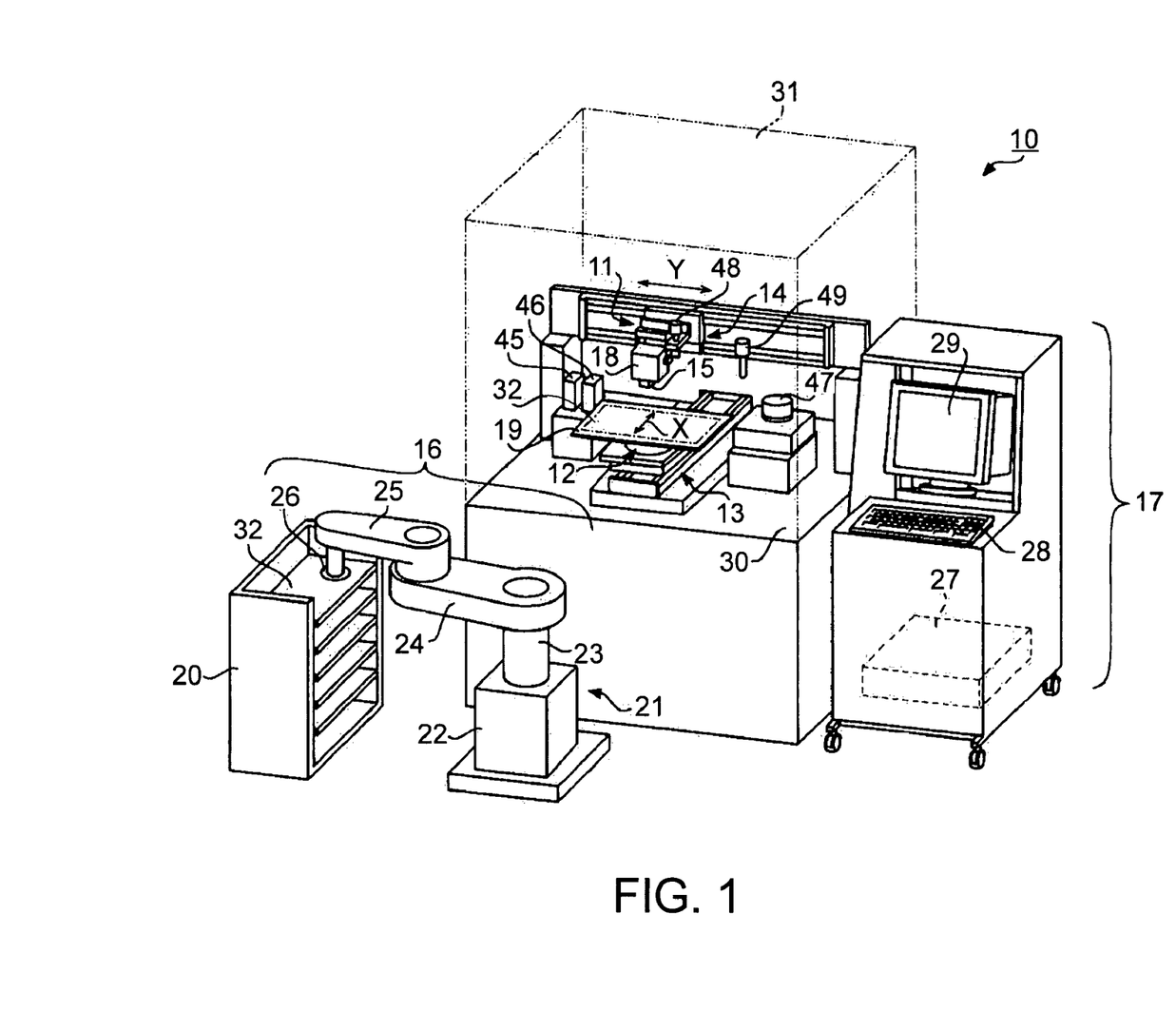
FIG. 1 is a perspective view illustrating the structure of a droplet discharge device.

A droplet discharge device will initially be described. FIG. 1 is a perspective view illustrating the structure of a droplet discharge device.

A droplet discharge device 10 is a device for discharging a function liquid 70 as a droplet 63 and making it to be adhered to a predetermined position of a substrate 32. The substrate 32 is a large size substrate on which a plurality of electron emitters 80 are formed.

As shown in FIG. 1, the droplet discharge device 10 includes a carriage 18 with a discharge head 15, a head position controller 11 to control the position of the discharge head 15, an adsorption table 19 to make the substrate 32 absorbed to a predetermined position, a substrate position controller 12 to correct the position of the substrate 32 mounted on the adsorption table 19, a primary scanning driver 13 to move the substrate 32 in the primary scanning direction with respect to the discharge head 15, a secondary scanning driver 14 to move the discharge head 15 in the secondary scanning disunion with respect to the substrate 32, a substrate feeder 16 to supply the substrate 32 to a predetermined operating position in the droplet discharge device 10, and a controller 17 to carry out the whole control over the droplet discharge device 10.

The head position controller 11, the substrate position controller 12, the primary scanning driver 13, and the secondary scanning driver 14 are placed on a base 30. These devices are covered with a cover 31, if needed.

The substrate feeder 16 includes a substrate holder 20 to hold the substrate 32 and a robot 21 to convey the substrate 32. The robot 21 includes a base table 22 placed on an installation surface such as a floor or the ground, an elevation axis 23 ascending and descending with respect to the base table 22, a first arm 24 rotating about the elevation axis 23, a second arm 25 rotating with respect to the first arm 24, and an adsorption pad 26 placed on the undersurface of the tip of the second arm 25. The adsorption pad 26 can adsorb the substrate 32 due to its air suction power.

Under the trail of the discharge bead 15 that is driven to move by the secondary scanning driver 14, a capping device 45 and a cleaning device 46 are disposed at one side of the primary scanning driver 13. An electronic balance 47 is disposed at the other side. The cleaning device 46 is a device to dean the discharge bead 15. The electronic balance 47 is a tool to measure the droplet weight of a function liquid discharged from a nozzle 50 of the discharge head 15, which will be described with reference to FIG. 3. The capping device 45 is a device so as to prevent the nozzle 50 from being dried or dogged while the discharge bead 15 being on standby.

A head camera 48 that moves in synchronization with the discharge bead 15 is disposed in the vicinity of the discharge head 15. A substrate camera 49 that is supported with a support device (not shown) disposed on the base 30 is provided at a position where the camera can capture the substrate 32.

The controller 17 includes a computer body 27 containing processor; a keyboard 28 as the input device, and a display 29 such as a cathode-ray tube (CRT) as the display.

Figure 2:
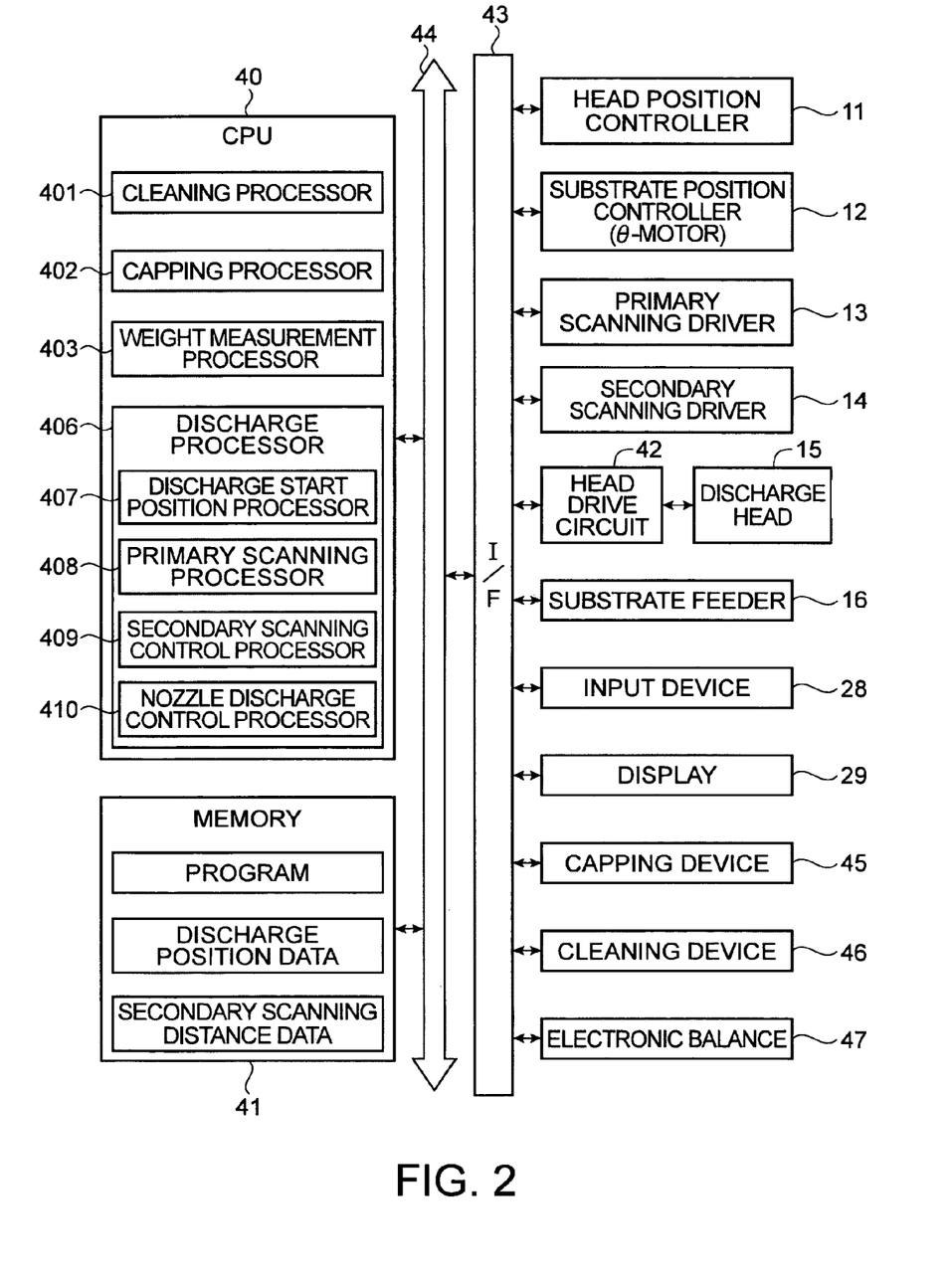
FIG. 2 is a block diagram illustrating the electric on of the droplet discharge device.

FIG. 2 is a block diagram illustrating the electric control of the droplet discharge device 10. A central processing unit (hereinafter referred to as CPU 40 that executes various arithmetic processing operations as a processor and memory 41 to which various information is stored are shown in FIG. 2.

Devices including the head position controller 11, the substrate position controller 12, the primary caning driver 13, the secondary scanning driver 14, and a head drive circuit 42 to drive the discharge head 15 are connected through an input/output (hereinafter referred to as I/O) interface 43 and a bus 44 to the CPU 40 and the memory 41. Devices including the substrate feeder 16, the input device 28, the display 29, the electronic balance 47, the cleaning device 46, and the capping device 45 are also connected through the I/O interface 43 and the bus 44 to the CPU 40 and the memory 41.

The memory 41 is a concept including semiconductor memory such as random access memory (RAMP) and read only memory (ROM) and external storages such as hard disks and compact disk read only memory (CD-ROM). In view of its function, an area in which a program having procedures to control operations of the droplet discharge device 10 is stored, an area in which the discharge position in the substrate 32 is stored as coordinate data, an area in which the distance of movement of the substrate 32 in the secondary scanning direction is stored, an area functioning as a work area, a temporary file, or the like for the CPU 40, and other areas are allocated in the memory.

The CPU 40 controls discharging the droplet of a function liquid to a predetermined position of the surface of the substrate 32 according to a program stored in the memory 41, and sections for implementing specific functions of the CPU 40 include a cleaning processor 401 to perform operations for cleaning process, a capping processor 402 to perform operations for capping process, a weight measurement processor 403 to perform operations for weight measurement using the electronic balance 47, and discharge processor 406 to perform operations for discharging a function liquid by the discharge head 15.

In more detailed description, the discharge processor 406 includes various function processors such as a discharge start position processor 407 to set the discharge head 15 to the initial position for droplet discharge, a primary scanning control processor 408 to perform operations for control of movement of the substrate 32 for a predetermined distance for primary manning in the primary scanning direction X, a secondary scanning control processor 409 to perform operations for control of movement of the discharge head 15 for a predetermined distance for secondary scanning the secondary scanning direction Y, and a nozzle discharge control poor 410 to perform operations for control of which of a plurality of nozzles in the discharge head 15 is actuated to disc a function liquid.

The functions described above are implemented by the program using the CPU 40 in the present embodiment However, if the functions can be implemented by using an electronic circuit alone without use of a CPU, such an electronic circuit may be used.

Figure 3A:
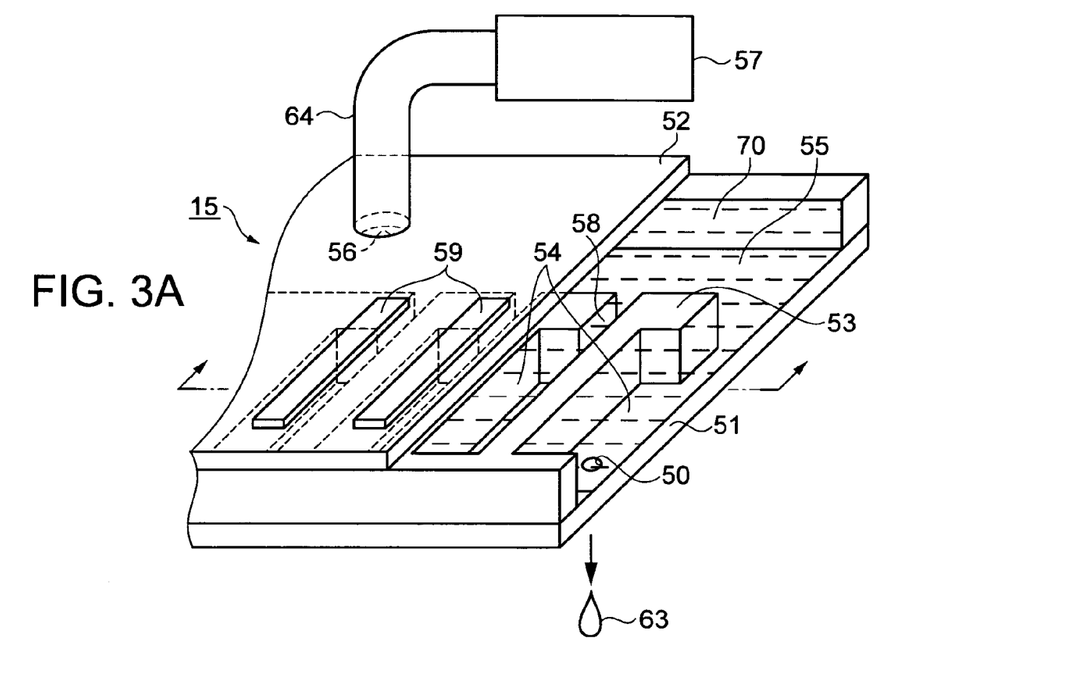
FIG. 3A is a peeve view illustrating the structure of a droplet discharge head and FIG. 3B is a sectional side view illustrating its part.
Figure 3B:
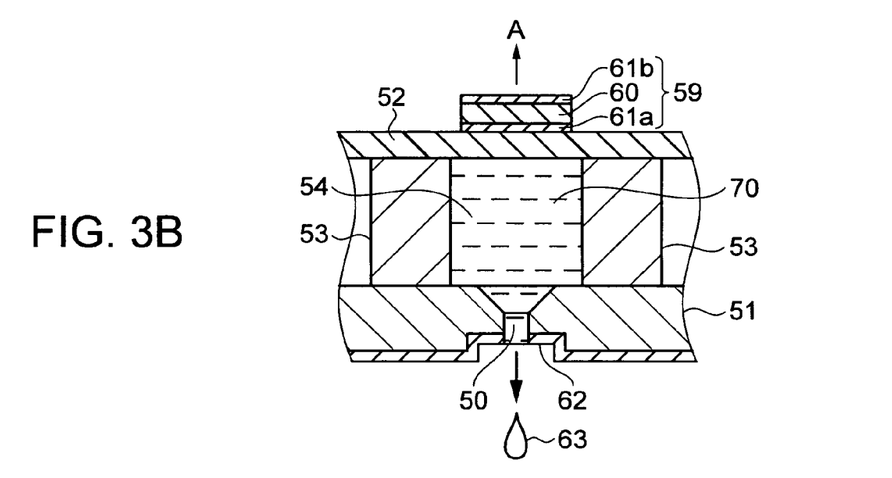

The discharge head 15 included in the droplet device 10 will next be described. FIG. 3A is a partially broken-away perspective view of the discharge head 15 and FIG. 3B is a sectional side view showing part of the discharge head 15.

As shown in FIG. 3A, the discharge head 15 included, for example, a nozzle plate 51 made of stainless steel, a vibration plate 52 facing the nozzle plate, and a plurality of partition members 53 connecting these plates. A plurality of function liquid chambers 54 and a function liquid reservoir 55 are formed between the nozzle plate 51 and the vibration plate 52 with the partition members 53. The plurality of function liquid chambers 54 and the function liquid reservoir 55 are in communication with each other through a path 58. The function liquid chambers 54 are firmed to be partitioned with the partition members 53 and aligned at regular intervals.

A function liquid supply hole 56 is formed at a suitable position in the vibration plate 52. A supply tank 57 to hold the function liquid 70 is connected through a conduit 64 to the function liquid supply hole 56. The supply tank 57 supplies a function liquid to the function liquid supply hole 56. The function liquid reservoir 55 is filled with the supplied function liquid 70, which further passes through the path 58, and with which the function liquid chamber 54 is then filled.

The nozzle 50 to emit a jet of the function liquid 70 from the function liquid chamber 54 is provided in the nozzle plate 51. A function liquid pressure member 59 is attached onto the back de of the surface of the vibration plate 52 on which the function liquid chamber 54 is formed, responding to the fusion liquid amber 54. The function liquid pressure member 59 has a pair of electrode 61a and 61b and a piezoelectric element member 60 sandwiched between the electrodes as shown in FIG. 3B. The piezoelectric element member 60 is deformed to protrude outwards, in the direction indicated by an arrow A, by applying a current to elides 61a and 61b, and thus the volume of the fusion liquid chamber 54 increases. Accordingly, the function liquid 70 corresponding to the increased volume flows from the function liquid reservoir 55 through the path 58 into the function liquid chamber 54.

When application of a current to the piezoelectric element member 60 is then terminated, both the piezoelectric element member 60 and the vibration plate 52 are restored to their original forms. As a result, the function liquid chamber 54 is also rested to its original volume, and thus the pressure of the function liquid 70 located inside the function liquid chamber 54 increases, causing the function liquid 70 to be sprayed as the droplet 63 from the nozzle 50 towards the substrate 32. A lyophobic function liquid layer 62 made from, for example, a Ni-tetrafluoroethylene eutectoid plated layer is provided on the periphery of the nozzle 50 so as to prevent fluctuation in flight direction of the droplet 63 and hole clogging of the nozzle 50.

Figure 4:
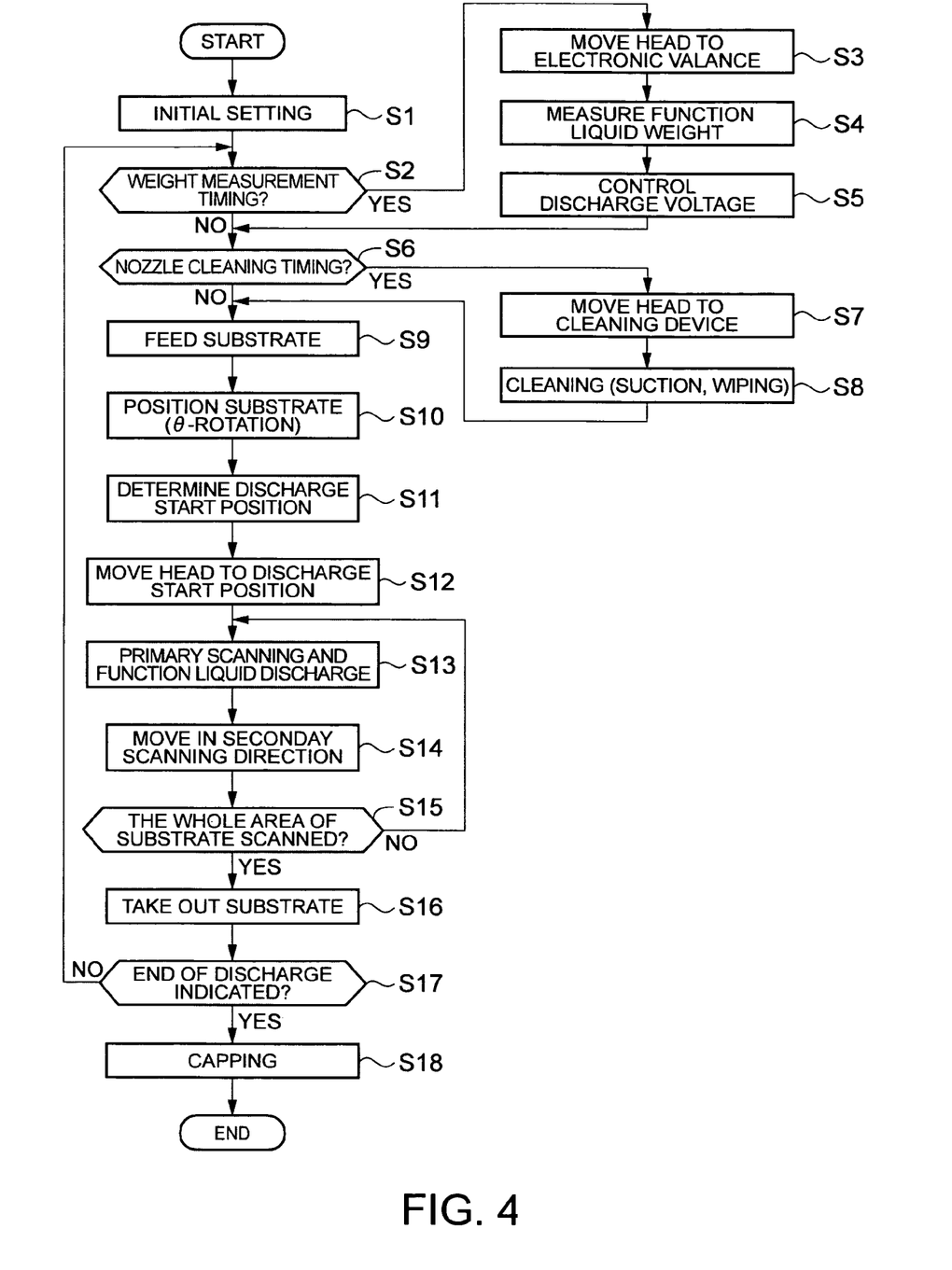
FIG. 4 is a flow chart illustrating operations of the droplet discharge device.

The basic operations of the droplet discharge device 10 will next be described with reference to FIG. 4. When an operator turns on the power for the droplet discharge device 10 to operate, the initial setting is performed (step S1). Specifically the carriage 18, the substrate feeder 16, the controller 17, and the like are set in a predetermined initial state.

Then, if the timing of weight measurement is shed (YES in step S2), the discharge head 15 is moved to the electronic balance 47 by the secondary scanning driver 14 (step S3), the amount of the droplet 63 of the function liquid 70 discharged from the nozzle 50 is measured by using the electronic balance 47 (step S4). The voltage to be applied to the piezoelectric element member 60 that corresponds to each nozzle 50 is adjusted in accordance with the characteristics of each nozzle 50 for discharging the function liquid 70 (step S5).

If the cleaning timing is reached (YES in step S6), the discharge head 15 is moved to the cleaning device 46 by the secondary scanning driver 14 (step S7), and is cleaned by the leaning device 46 (step S8).

If neither the timing of weight measurement nor the cleaning timing is reached (NO in steps S2 and S6), or these operations are completed, the process proceeds from step S1 to step S9. In step S9, the substrate 32 is fed by the substrate feeder 16.

The substrate 32 fixed to the adsorption table 19 is positioned by rotating the output axis of a θ-motor located in the substrate position controller 12 while observing the substrate 32 with the substrate camera 49 (step S10). Alignment of the discharge head 15 is performed with the head camera 48, the position for sting discharge is determined by computing (step S11), and the discharge head 15 is moved to the discharge start position by suitable operations of the primary scanning driver 13 and the secondary scanning driver 14 (step S12).

Primary scanning in the direction X is started while discharge of the function liquid 70 is started at the same time (step S13). Specifically, operating the primary scanning drover 13 makes the substrate 32 move to scan linearly at a constant vanity in the primary scanning direction X. On the way of movement, when the nozzle 50 reaches the discharging position, the droplet 63 is discharged from the nozzle 50 according to function liquid discharge signals computed by the nozzle discharge control processor 410.

When one primary scanning is completed, the discharge head 15 is moved for a predetermined distance in the secondary scanning direction, in which the discharge head 15 is driven by the secondary scanning driver 14 (step S14). Subsequently, the primary scanning and ink disc are performed repeatedly (NO in step S15, the process proceeds to step S13).

The discharging operations of the function liquid 70 by the discharge head 15 as descried above for the whole area of the substrate 32 is completed (YES in step S15), the substrate 32 is taken out (step S16). Thereafter, unless end of operation is indicated by an operator (NO in step S17), the process returns to step S2 and the operations of discharging the function liquid 70 onto another substrate 32 are repeated.

If end of operation is indicated by the operator (YES in step S17), the discharge head 15 is delivered to the capping device 45 by the secondary scanning driver 14 and is then capped by the capping device 45 (step S18).

Figure 5A:
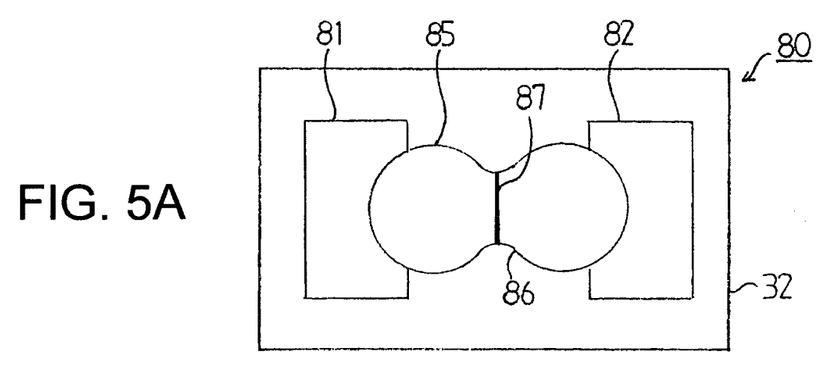
FIG. 5A is a plan view and FIG. 5B is a sectional side view of an electron emitter in a first embodiment.
Figure 5B:
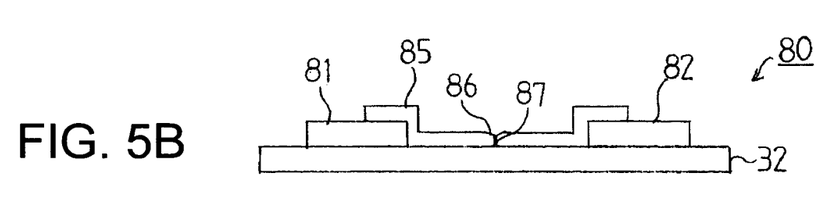

The structure of the electron emitter 80 in the embodiment will next be described with reference to FIGS. 5A and 5B. FIG. 5A is a plan view and FIG. 5B is a sectional view of the electron emitter 80.

As shown in FIG. 5A, the substrate 32 has a pair of element electrodes 81 and 82 and a conductive film 85. The conductive film 85 includes a constricted part 86 extending across it substantially in straight in a direction perpendicular to the direction along which the element electrodes 81 and 82 facing each other line up. An electron emission section 87 is formed in the constricted part 86.

As the substrate 32 quartz glass, glass having reduced content of impurities such as Na, blue sheet glass blue sheet glass with $SiO_2$ deposited by sputtering or the like, ceramics such as alumina, and Si substrates, and the like can be used.

Commonly used conductive materials can be used as the element electrodes 81 and 82. For example, metals such as Ni, Cr, Au, Mo, W, Pt, Ti, Al, Cu, and Pd, alloys, and the like can be used.

As the conductive film 85, metals such as Pd, Pt, Ru, Ag, Au, Ti, In, Cu, Cr, Fe, Zn, Sn, Ta, W, and Pb and metal oxides such as PdO, $SnO_2$, $In_2O_3$, and $Sb_2O_3$ can be used.

As in FIG. 5B, the constricted part 86 is formed in the conductive film 85 so as to have a thinner film thickness than other parts. The electron emission section 87 is formed in the constricted part 86.

Figure 6:
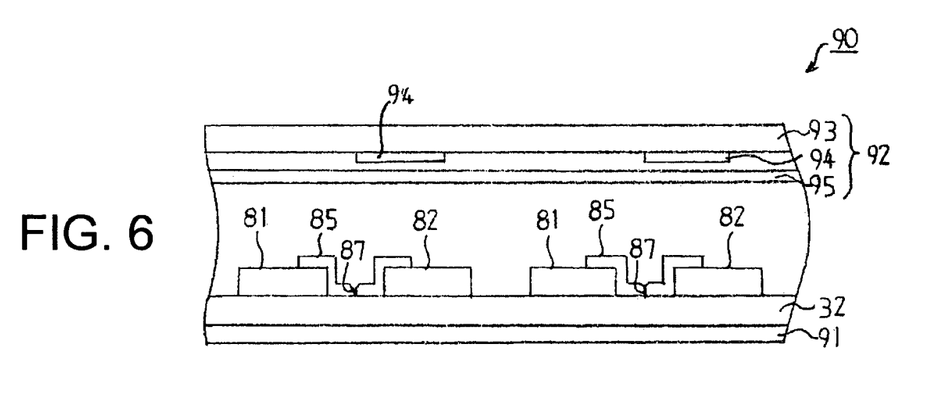
FIG. 6 is a sectional side view illustrating a SED as an example of an electro-optical device.

FIG. 6 is a partial sectional view illustrating an SED 90 as an example of a display having the above-described electron emitter 80. As shown in FIG. 6, an electro-optical device 90 includes a rear plate 91 to which the substrate 32 having a plurality of electron emitters 80 is fixed and a face plate 92. The rear plate 91 and the face plate 92 are sealed with a spacer (not shown) interposed therebetween. The lace plate 92 includes a glass substrate 93, fluorescent screens 94, a metal back 95, and the like.

Figure 7:
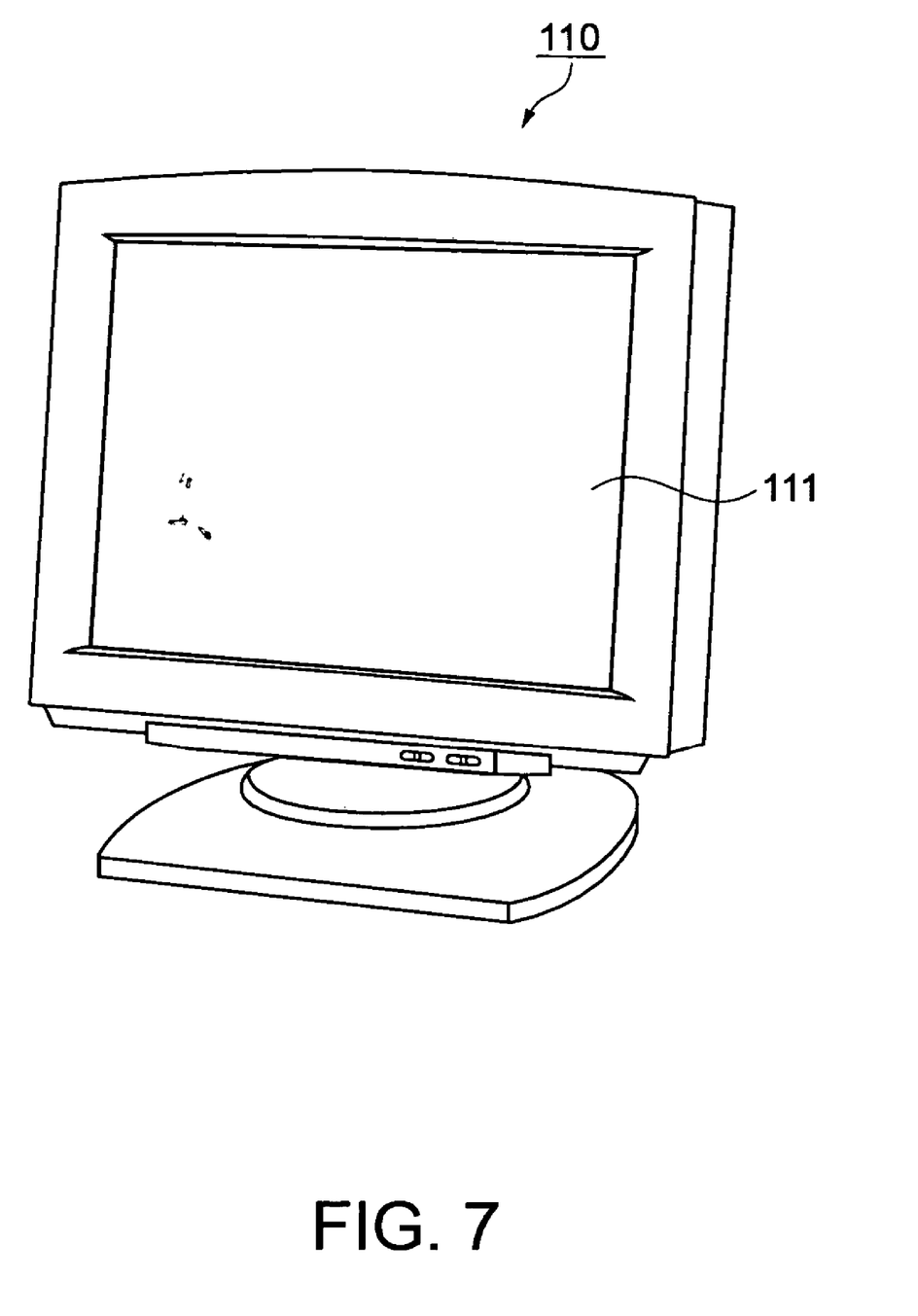
FIG. 7 is a perspective view illustrating a television receiver as an example of an electronic apparatus.

FIG. 7 is a perspective view illustrating a television receiver 100 as an example of an electronic apparatus having the SED 90 as the above-described electro-optical device mounted thereon. As shown in FIG. 7, the SED 90 is incorporated in a display 101 of the television receiver 100. In addition to this, examples of the electronic apparatus include, for example, personal computers and various electronic items.

In addition to the use for displays as described above, the electron emitter may be used as a coherent electron source in which the number of electron beams emitted from a solid and their emission directions, electron density distribution, and brightness can be controlled by utilizing the wave character of electron, and also as an electron source of an apparatus to which the above coherent electron source is applied such as a coherent electron beam converging apparatus, an electron holography apparatus, a monochromatic electron gun, an electron microscope, a multiple coherent electron beam generator, or an electron beam exposure apparatus.

Figure 8A:
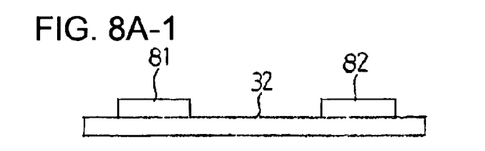

A method of manufacturing the electron emitter 80 will next be described with reference to FIGS. 8A-1 through 8E.

Figure 8A:
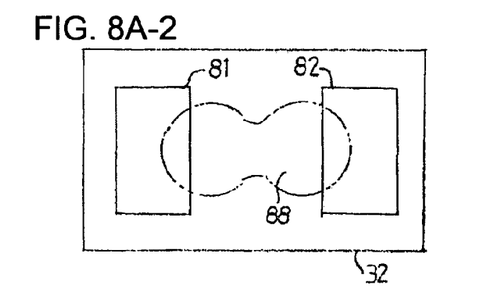

As sown in FIG. 8A-1, after the substrate 32 is cleaned with pure water and an organic solvent medium or the like, the element elides 81 and 82 are formed. It is possible to employ as the method of forming the element electrodes 81 and 82 a method of making a paste of conductive material in a desired shape by a printing method and then heating it, a method of discharging the function liquid 70 containing a conductive material onto a substrate by the droplet discharge 10 and then heating it, a method of depositing an element material by vacuum deposition sputtering, or the like and then forming an electrode having a certain shape by a photolithography method, or the like. Thereafter, as shown in FIG. 8A-2, a surface treatment is applied so as to form a region having lyophilicity in a desired shape at a predetermined position at which the function liquid 70 is to be discharged in the subsequent process. The surface treatment is performed, for example, so that the on having lyophilicity is formed in a constricted shape. Reference numeral 88 denotes the shape of a lyophilicity treatment region that has been formed to have lyophilicity by the surface treatment.

In addition, the treatment in the lyophilicity treatment region 88 is performed in the case where the area other than the lyophilicity treatment region 88 is lyophobic. If, for example, the area other than the lyophilicity treatment region 88 is also lyophilic, a lyophilicity treatment may be applied to the area other than the lyophilicity treatment region 88. If a constricted part 84 to be described later is formed when the droplet 63 is discharged onto the substrate 32, a surface treatment such as the lyophilicity treatment may be omitted.

Figure 8B:
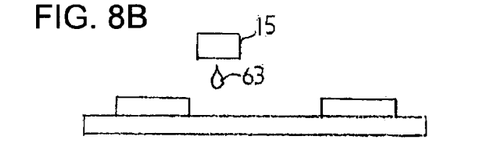

As shown FIG. 8B, the function liquid 70 is discharged as the droplet 63 from the discharge head 15 of the droplet discharge device 10 towards the lyophilicity treatment region 88. A liquid in which the above-described conductive material such as metal is dispersed in water or a solvent medium is used as the function liquid 70.

Figure 8C:
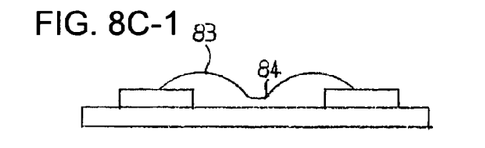
Figure 8C:
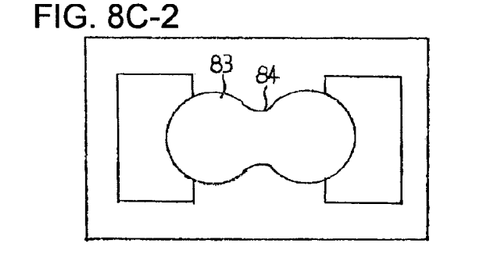

As shown in FIGS. 8C-1 and 8C-2, when the droplet 63 is discharged onto the substrate 32, a liquid film 83 as a liquid-state object is formed. When the droplet 63 arrives in the lyophilicity treatment region 88 of the substrate 32, the liquid film 83 is farmed in a similar shape to that formed on the substrate 32 by using the lyophilicity treatment. Namely, since the shape of the lyophilicity treatment region 88 is constricted, the liquid film 83 adheres to the surface of the substrate 32 so as to use the lyophilicity treatment region 88 as the inter and thereby have the interface with the constricted part. Accordingly, the liquid film 83 includes at the corresponding position to the constricted part of the interface the three dimensional constricted part 84 extending across the film in a direction perpendicular to the direction along which the element elides 81 and 82 fang each other line up. In other words, the constricted part 84 is formed not only two-dimensionally but also three-dimensionally.

Figure 8D:
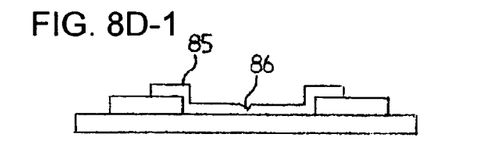
Figure 8D:
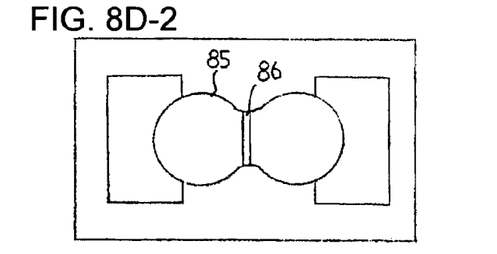

As shown in FIGS. 8D-1 and 8D-2, the conductive film 85 is formed by heating and firing. By heating, the solvent contained in the liquid film 83 is evaporated and the material to be contained in the conductive film 85 is solidified to form the conductive film 85. At this point the constricted part 84 of the liquid film 83 becomes the solidified constricted part 86 of the conductive film 85 by heating. This constricted part 86 becomes a latent image section in which the electron emission section 87 is easily formed, which will be described later.

Figure 8E:
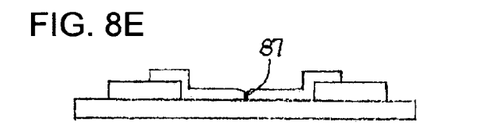

In the process shown in FIG. 8E, a current is applied. Specifically, a voltage is applied between the pair of element electrodes 81 and 82 to pass a current though the conductive film 85. When a current flows by applying a voltage between the element electrode 81 and 82, the electron emission section 87 is formed in the constricted part 86 of the conducive film 85. The cause is that the constricted part 86 has the smallest current-carrying cross-sectional area due to its least width (the length in the direction perpendicular to the direction along which the element electrodes 81 and 82 facing each other line up) as well as its least film thickness in the conductive film 85. The constricted part 86 having the smallest current-carrying cross-sectional area locally reaches a high temperature because of Joule heat, and therefore fusion or the like of a metal or the like, which is a material for the conductive film 85, occurs in the constricted part 86. The application of a current causes a gap of the order of a few nanometers (nm) to be formed in a portion of the conductive film 85 where the structural change such as damage, deformation, or deterioration has occurred. The gap of the order of a few nm may also be formed because of heat contraction during a cooling process following the metal fusion in the constricted part 86.

When the above process, ends the electron emitter 80 is completed after passing through predetermined processes such as an electric characteristic inspection.

Effects described in the following are obtained according to the electron emitter manufacturing method of the first embodiment.

(1) The liquid film 83 formed by discharging the droplet 63 onto the substrate 32 has a shape having the constricted part 84. Since the liquid film 83 becomes the conductive film 85 by drying, the constricted part 84 formed in the liquid film 83 becomes the constricted part 84 in the conductive film 85 after dried. Since the constricted part 86 is formed in the conductive film 85, Joule heat is generated in the conductive film during application of a current and thereafter heat contraction or the like oaks, thereby forming the electron emission section 87 in the constricted part 86. Consequently, formation of the considered part 86 allows easy control of where the electron emission section 87 is formed.

(2) When the liquid film 83 is dried, the latent image section 87 is made in a portion corresponding to the connected part 84 in the liquid film 83. The latent image section is determined at one portion corresponding to the constricted part 84, namely, at one portion having the smallest current-carrying cross-section area when dried, even if there are a plurality of constricted parts. Therefore, limitations in element structure as imposed in former methods are not needed. For example, it is unnecessary to add drying pass whenever a droplet of one of two dots for a conductive film is discharged in order to obtain different film thicknesses of the dots. It is also unnecessary to increase the ratio in film thickness between a conductive film and an element electrode. The electron emitter 80 can thus be manufactured using simple droplet discharge conditions.

(3) The constricted part 84 has a narrower width than other portions of the liquid film 83. When a current is applied, the electron emission section 87 can therefore be formed in the constricted part 86 formed by drying due to generation of Joule heat.

(4) The constricted part 84 has a thinner film thickness than other portions in the liquid film 83. When a current is applied, the electron emission section 87 can therefore be formed the constituted part 86 due to generation of Joule heat.

(5) A surface treatment of a constituted shape is applied onto the substrate 32 beforehand. Therefore, when the droplet 63 is discharged, a shape having the constricted part 84 in the liquid film 83 is made along the lines of the constricted shape caused by the surface treatment. The conductive film 85 having constricted part 84 can thus be formed easily.

(6) The droplet 63 spreads in a wet state by surface treatment of the substrate 32 to form the liquid film 83, and therefore it is sufficient to discharge the droplet 63 to one portion. Drive control of the discharge head 15 can thereby be simplified.

Second Embodiment

A second embodiment will next be described. The structure of the droplet discharge device 10 and the block diagram of its electric control, and the structure of the discharge head 15 are the same as in the first embodiment and the corresponding descriptions are omitted. The electro-optical device 90 and the electronic apparatus 100 are also the same as in the first embodiment and the corresponding descriptions are also omitted.

Figure 9A:
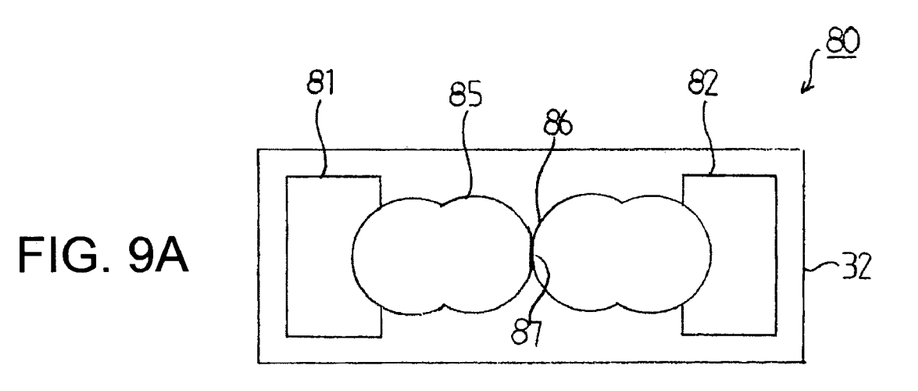
FIG. 9A is a plan view and FIG. 9B is a sectional view of an electron emitter in a second embodiment.
Figure 9B:
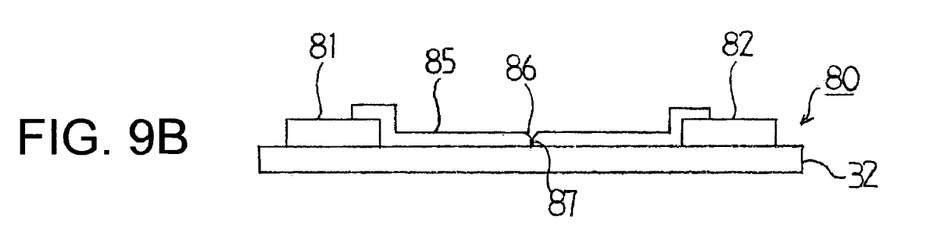

The structure of the electron emitter 80 in the embodiment will be described with reference to FIGS. 9A and 9B. FIG. 9A is a plan view and FIG. 9B is a sectional view of the electron emitter 80.

As shown in FIG. 9A, the electron emitter 80 includes the pair of element electrodes 81 and 82 and the conductive film 85 on the substrate 32. The conductive film 85 has the constricted part 86 as viewed from the top, and the electron emission section 87 is formed in the constricted part 86.

As the substrate 32, quartz glass, glass having reduced content of impurities such as Na, blue sheet glass, blue sheet glass with $SiO_2$ deposited by sputtering or the like, ceramics such as alumina, Si substrates, and the like can be used.

Commonly used conductive materials can be used as the element electrodes 81 and 82. For example, metals such as Ni, Cr, Au, Mo, W, Pt, Ti, Al, Cu, and Pd, alloys, and the like can be used.

As the conductive film 85, metals such as Pd, Pt, Ru, Ag, Au, Ti, In, Cu, Cr, Fe, Zn, Sn, Ta, W, and Pb and metal oxides such as PdO, $SnO_2$, $In_2O_3$, PbO, and $Sb_2O_3$ can be used.

As shown in FIG. 9B, the constricted part 86 having a thinner film thickness than other parts is formed in the conductive film 85. The election emission section 87 is formed in the constricted part 86.

A method of manufacturing the electron emitter 80 will next be described with reference to FIGS. 10A through 10G.

Figure 10A:
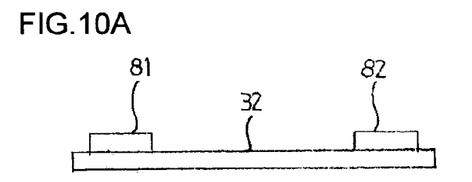

As shown FIG. 10A, after the substrate 32 is cleaned with pure water and an organic solvent medium or the like, the element electrodes 81 and 82 are formed. It is possible to employ as the method of forming the element electrodes 81 and 82 a method of making a paste of conductive material in a desired shape by a printing method and then heating it, a method of discharging the function liquid 70 containing a conductive material onto a substrate by the droplet discharge device 10 and then heating it, a method of depositing an element electrode material by vacuum deposition, sputtering, or the like and then forming an electrode having a certain shape by a photolithography method, or the like.

Figure 10B:
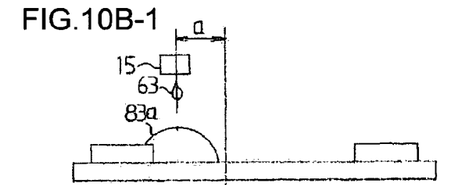
Figure 10B:
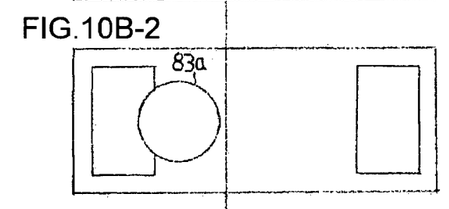

As showing FIGS. 10B-1 and 10B-2, the function liquid 70 is discharged as the droplet 63 from the discharge head 15 of the droplet device 10 to a predetermined position of the substrate 32. A liquid in which the above-described conductive material such as metal is dispersed in water or a solvent medium is used as the function liquid 70. A liquid film 83$a$ is formed from the droplet 63, which are discharged onto the substrate 32, on the substrate 32. The position of the charge head for forming the liquid film 83$a$ is hereinafter referred to as a first discharge head position.

Figure 10C:
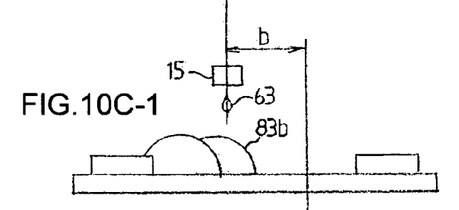
Figure 10C:
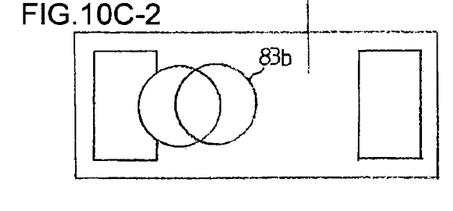

As shown in FIGS. 10C-1 and 10C-2, the droplet 63 is discharged from a second discharge head position that is located at a discharge pitch distance a from the first disc head position shown in FIG. 10B-1, thereby forming a liquid film 83$b$.

Figure 10D:
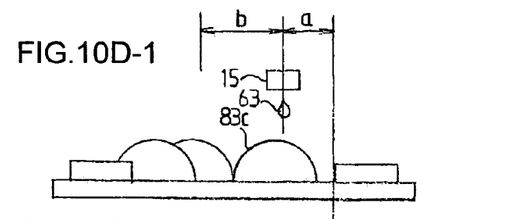
Figure 10D:
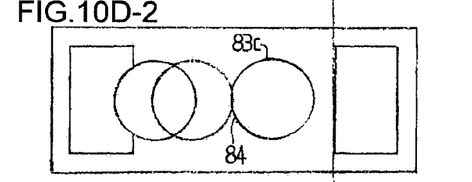

As shown in FIGS. 10D-1 and 10D-2, the droplet 63 is discharged from a third discharge head position that is located at a pitch distance from the second discharge head position shown in FIG. 10C-1, thereby forming a liquid film 83$c$. In this case, the pitch distance b is defined to be greater than the pitch distance a. Because the pitch distance b is greater than the pith distance a, a portion where the liquid film 83$b$ and the liquid film 83 $c$ are placed one atop the other is small. As a result the constricted part 84 is formed in a portion where the liquid film 83$b$ and the liquid film 83$c$ are in contact with each other.

Figure 10E:
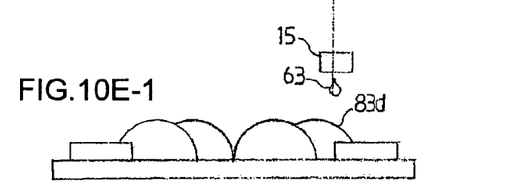
Figure 10E:
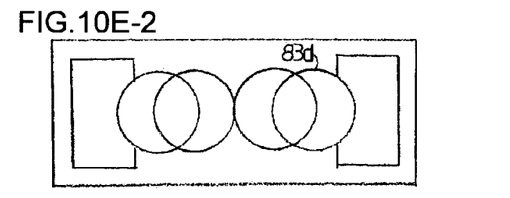

As shown in FIGS. 10E-1 and 10E-2, the droplet 63 is discharged from a fourth discharge head position that is located at a pitch distance a from the third discharge head position shown in FIG. 10D-1, thereby forming a liquid film 83$d$. As described hitherto, the liquid films 83$a$ to 83$d$ are formed by disc of the droplets 63, resulting in formation of the liquid film 83.

Figure 10F:
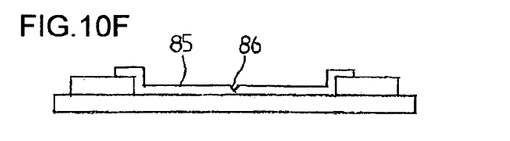

As shown FIG. 10F, the conductive film 85 is formed by heating and firing. By heating, the solvent contained in the liquid film 83 is evaporated and the material to be contained in the conductive film 85 is solidified to form the conductive film 85. At this point, the constricted part 84 of the liquid film 83 becomes the solidified constricted part 86 of the conductive film 85 by heating. This constricted part 86 becomes a latent image section in which the electron emission section 87 is easily formed, which will be described later.

Figure 10G:
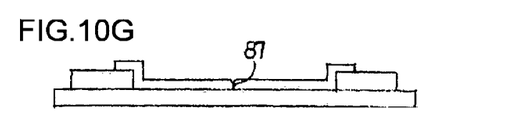

In the process shown in FIG. 10G, a current is applied. Specifically, a voltage is applied between the pair of element electrodes 81 and 82 to pass a current through the conductive film 85. When a current flows by applying a voltage between the element electrodes 81 and 82, the electron emission section 87 is formed in the constricted part 86 of the conductive film 85. As a result of applying a current a portion of the conductive film 85 has the structural change such as damage, deformation, or deterioration. This portion constitutes the electron emission section 87. As shown in FIG. 10G, the electron emission section 87 is formed in the constricted part 86, which is a thinner part of the conductive film 85.

When the above process ends, the electron emitter 80 is completed after passing through predetermined processes such as an electric characteristic inspection.

According to the electron emitter manufacturing method of the second embodiment, in addition to the same effects as shown in the above (1), (2), (3), and (4) in the first embodiment an effect described in the following obtained.

(1) If the distance between the second discharge head position and the third discharge head position is extended, the distance between the liquid film 83$b$ and the liquid film 83$c$ is also extended, and therefore a portion where the liquid films 83$b$ and 83$c$ are placed one atop the other becomes reduced in size. It is possible to form the constricted part 84 in this manner. Thus, the electron emission section 87 can be formed easily by reducing the current-carrying cross-sectional area.

Third Embodiment

A third embodiment will next be described. The structure of the droplet discharge device 10 and the block diagram of its electric control, and the structure of the discharge head 15 are the same as in the first embodiment and the corresponding descriptions are omitted. The electro-optical device 90 and the electronic apparatus 100 are also the same as in the first embodiment and the corresponding descriptions are also omitted.

Figure 11A:
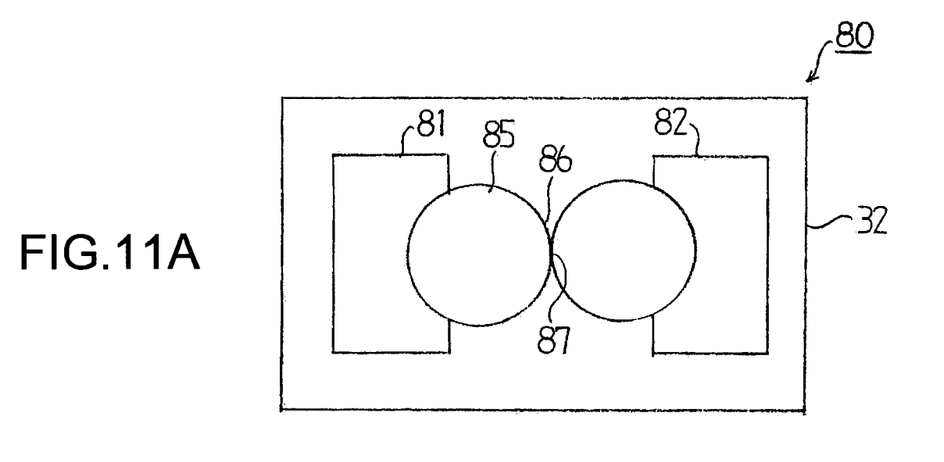
FIG. 11A is a plan view and FIG. 11B is a sectional view of an electron emitter in a third embodiment.
Figure 11B:
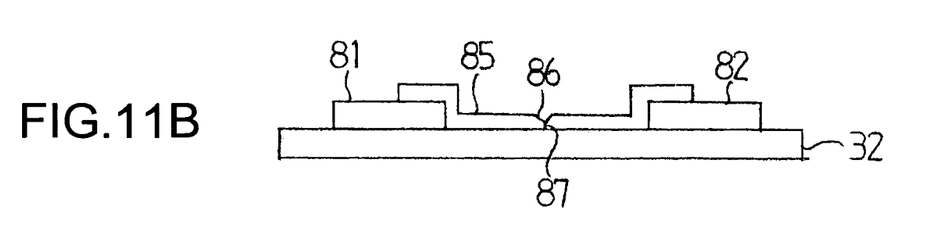

The structure of the electron emitter 80 in the embodiment will be described with reference to FIGS. 11A and 11B. FIG. 11A is a plan view and FIG. 11B is a sectional view of the electron emitter 80.

As shown in FIG. 11A, the electron emitter 80 includes the pair of element elect 81 and 82 and the conductive film 85 on the substrate 32. The conducive film 85 has the constricted part 86 as viewed from the top, and the electron emission section 87 is firmed in the constricted part 86.

As the substrate 32, quartz lass, having reduced content of impurities such as Na, blue sheet glass, blue sheet glass with $SiO_2$ deposited by sputtering or the like, ceramics such as alumina, and Si substrates, and the like can be used.

Commonly used conductive materials can be used as the element electrodes 81 and 82. For example, metals such as Ni, Cr, Au, Mo, Pt, Ti, Al, Cu, and Pd, alloys, and the like can be used.

As the conductive film 85, metals such as Pd, Pt, Ru, Ag, Au, Ti, In, Cu, Cr, Fe, Zn, Sn, Ta, W, and Pb and metal oxides such as PdO, $SnO_2$, $In_2O_3$, PbO, and $Sb_2O_3$ can be used.

As shown in FIG. 11B, the constituted part 86 having a thinner film is thickness than other parts is formed in the conductive film 85. The electron emission section 87 is formed in the constricted part 86.

A method of manufacturing the electron emitter 80 will next be described with reference to FIGS. 12A through 12E.

Figure 12A:
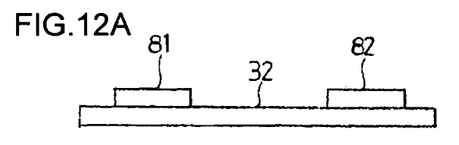

As shown in FIG. 12A, after the substrate 32 is cleaned with pure water and an organic solvent medium or the like, the element elects 81 and 82 are formed. It is possible to employ as the method of forming the element elides 81 and 82 a method of making a paste of conductive material in a desired shape by a printing method and then heating it, a method of discharging the function liquid 70 containing a conductive material onto a substrate by the droplet discharge device 10 and then heating it, a method of depositing an element electrode material by vacuum deposition, sputtering or the like and then forming an electrode having a predetermined shape by a photolithography method, or the like.

Figure 12B:
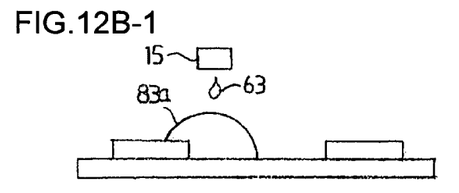
Figure 12B:
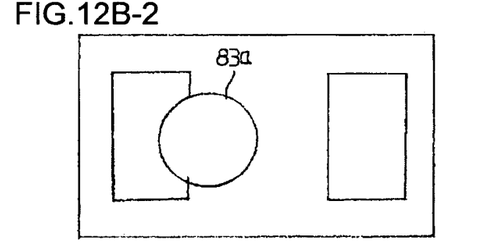

As shown in 12B-1 and 12B-2, the function liquid 70 is discharged as the droplet 63 from the disc head 15 of the droplet disc device 10 to a predetermined position of the substrate 32 to form the liquid film 83a. A liquid in which the above-described conductive material such as metal is diffused in water or a solvent medium is used as the function liquid 70 that is a material for the liquid film 83a. The position of the discharge head for forming the liquid film 83a is hereinafter referred to as a first discharge head position.

Figure 12C:
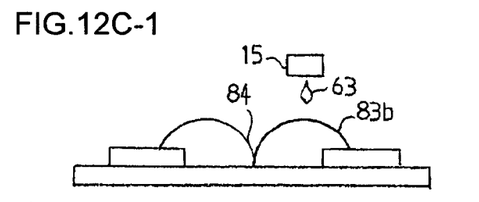
Figure 12C:
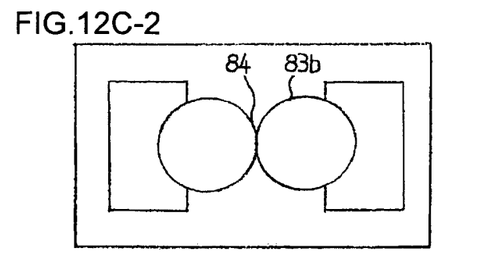

As shown in FIG. 12C-1 and 12C-2, the droplet 63 is discharged from a second discharge head position that is located apart from the first discharge head position shown in FIG. 12B-1, thereby forming a liquid film 83b. A liquid used as a function liquid 71 that is a material for the liquid film 83b contains a conductive material dispersed in a solvent that repels the solvent of the function liquid 70 used for the liquid film 83a without being mixed with it. This allows the liquid film 83b to repel the liquid film 83a without being mixed with it. The constricted part 84 is thus farmed in a portion where the liquid film 83a and the liquid film 83b are in contact with each other. The two kinds of function liquids 70 and 71 used for formation of the liquid film 83a and the liquid film 83b can be appropriately selected from combinations of function liquids in which their solvents (water or solvent medium) repel with each other without being mixed with each other.

The embodiment employs a function liquid using water as its solvent and a function liquid using as its solvent an organic solvent medium that repels water without being mixed with it as the two kinds of function liquids 70 and 71. As the organic solvent medium that repels water, which is a polar solvent, without being mixed with it, organic solvent media that are nonpolar solvents (hydrophobic solvents) can be used. The organic solvent medium can be selected as appropriate in consideration of the volatility, boiling point, safety, and the like. It is particularly preferable to use an organic solvent medium having the boiling point within the range 60° C. to 200° C. Oil based solvents (oil can also be used as the hydrophobic solvent that repels water without being mixed with it. If the oil based solvent used is one that is difficult to dry, the solvent is removed by firing. In this case, the oil based solvent can be fired in a reducing ambient to be carbonized so as to remain as carbon in a conductive film, or can be fired in an oxidation ambient (that is, atmospheric ambient) such that carbon made by oxidizing the oil based solvent is oxidized to be vaporized as carbon oxide (CO or $CO_2$) and removed. Examples of the nonpolar (hydrophobic) organic solvent include benzene, hexane, cyclohexane, carbon tetrachloride, and the like. Examples of the oil based solvent include petroleum aliphatic hydrocarbons such as kerosene and Isopar registered trademark), aliphatic hydrocarbons such as n-hexane and n-pentane, aromatic hydrocarbons such as toluene and xylene, silicon oil liquid paraffin, butyl sebacate, and the like.

Figure 12D:
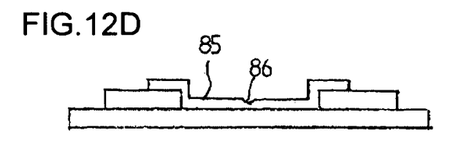

As shown in FIG. 12D, the conductive film 85 is formed by heating and firing. By heating, the solvents contained in the liquid films 83a and 83b are evaporated and the material to be contained in the conductive film 85 is solidified to form the conductive film 85. At this point, the constricted part 84 becomes the solidified constricted part 86 of the conducive film 85 by heating. This constricted part 86 becomes a latent image section in which the electron emission section 87 is easily formed, which will be described later.

Figure 12E:
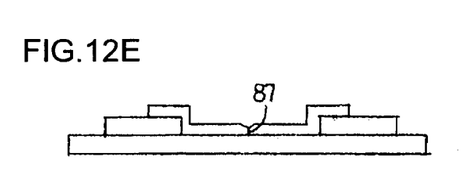

In the process shown in FIG. 12E, a current is applied. Specifically, a voltage is applied between the pair of element electrodes 81 and 82 to pass a current through the conductive film 85. When a current flows by applying a voltage between the element electrodes 81 and 82, the electron emission section 87 is formed in the constricted part 86 of the conductive film 85. As a result of applying a current, a portion of the conductive film 85 has the structural change such as damage, deformation, or deterioration. This portion constitutes the electron emission section 87. As shown in FIG. 12E, the electron emission section 87 is formed in the constituted part 86, which is a thinner part of the conducive film 85.

When the above process ends, the electron emitter 80 is completed after passing through predetermined passes such as an electric characteristic inspection. According to the electron emitter manufacturing method of the third embodiment in addition to the same effects as show in the above (1), (2), (3), and (4) in the first embodiment, an effect descried in the following is obtained.

(1) Since the function liquids 70 containing different solvents are discharged as droplets to form the liquid films 83a and 83b, the liquid films 83a and 83b repel each other and their bottom portions, which are located lower than the tops, are in contact with each other at the interface. The constricted part 84 can thus be formed along the contact portion at the interface.

The invention is not intended to be limited to the embodiments described above, and may be practiced as follows.

(Modification 1) The droplets 63 are discharged sequentially at different discharge pitch positions as shown in FIGS. 10A through 10E-2, but the discharge is not limited to this. For example, a plurality of droplets among four droplets may be concurrently discharged using the discharge head 15 with a plurality of nozzles 50 corresponding to the first to fourth discharge pitch positions. In this case, since the droplets 63 are discharged in accordance with the discharge pitch distances, the constricted part 84 can also be formed in the state of the liquid film 83.

(Modification 2) Heating and forming are performed after the liquid film 83 is as shown in FIG. 10F but they are not limbed to this. For example, the liquid films 83a and 83d may be formed by discharging the droplets 63 at the first and fourth discharge pitch positions and thereafter drying is performed, and then the liquid films 83b and 83c may be formed by discharging the droplets 63 at the second and third discharge pitch positions. This case does not include drying between forming the liquid film 83b and forming the liquid film 83c, and therefore the number of procures of drying a be reduced as compared to the former methods.

(Modification 3) The same function liquid 70 is used for the discharges in the first and second embodiments, but the function liquid 70 is not limited to this. For example, the function liquid 70 containing different materials may be discharged at different positions of discharging the droplet 63. In this case, the liquid films of the droplet 63 are in contact with each other at the interface, and therefore the constricted part 84 can also be formed.

(Modification 4) In the embodiments described above, the conductive film has a constricted shape in which two dots are combined at their ends, but the shape of the conductive film is not limited to this. For example, the conducive film can be formed in such a shape that has two regions of a circle and a circular shape that are placed inside and outside the electron emission section to face each other. In this case, the function liquids 70 and 71 used in the third embodiment are used, one function liquid 70 (71) is discharged to form a liquid film (liquid-state object) of a circular shape, as viewed from the top, on the substrate, and then the other function liquid 71 (70) is discharged to form a liquid film (liquid-state object) of a circle shape, as viewed from the top, inside the circular liquid film. A constricted part of a circle shape, as viewed from the top, is formed at the interface of both liquid films. By drying and firing this park a conductive film having one concentric constricted part (latent image section) is formed.

What is claimed is:

1. A method of manufacturing an electron emitter having a pair of element electrodes formed on a substrate, a conductive film connected to both of the element electrodes, and an electron emission section formed in part of the conductive film, the method comprising:

discharging a droplet of a function liquid containing a material for forming the conductive film onto a discharge surface of the substrate by a droplet discharge device to adhere a liquid-state object to at least part of an area in which the conductive film is to be formed;

drying the liquid-state object so as to make the liquid-state object become the conductive film; and forming the electron emission section in the conductive film by applying a current between the pair of element electrodes;

wherein, when accompanied by the drying to form the conductive film, the discharging forms the liquid-state object in a shape having a constricted part for forming a latent image section, the constricted part having a film thickness in a portion for forming the electron emitter that is thinner than a film thickness of the conductive film outside the constricted part; and wherein the discharging is performed to discharge function liquids containing a material for forming the conductive film in solvents that repel each other at different positions of the substrate and combine the function liquids to form the constricted part in an interface of the function liquids.

2. The method of manufacturing an electron emitter according to claim 1, wherein the discharging is performed to form the droplet so that a surface of the droplet contact with the discharge surface has a shape of being constricted in a portion corresponding to an end of the electron emission section, and wherein the dying makes the droplet dried to form the latent image section that facilitates formation of the electron emission section in a portion corresponding to the constricted part of the droplet.

3. The method of manufacturing an electron emitter according to claim 1, wherein the discharging is performed to discharge the function liquid onto the discharge surface to which a surface treatment inducing the droplet so that the surface of the droplet in contact with the discharge surface has a shape of being constricted in a portion corresponding to an end of the electron emission section has been applied.

* * * * *